United States Patent
Kanbe

(10) Patent No.: US 11,156,446 B2
(45) Date of Patent: Oct. 26, 2021

(54) POSITION MEASUREMENT METHOD AND POSITION MEASUREMENT SYSTEM FOR OBJECT IN MACHINE TOOL

(71) Applicant: OKUMA CORPORATION, Niwa-Gun (JP)

(72) Inventor: Reiji Kanbe, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 45 days.

(21) Appl. No.: 15/930,783

(22) Filed: May 13, 2020

(65) Prior Publication Data

US 2020/0378738 A1 Dec. 3, 2020

(30) Foreign Application Priority Data

May 30, 2019 (JP) .............................. JP2019-101666

(51) Int. Cl.
*G01B 5/008* (2006.01)
*G01B 5/12* (2006.01)

(52) U.S. Cl.
CPC ............... *G01B 5/008* (2013.01); *G01B 5/12* (2013.01)

(58) Field of Classification Search
CPC .................... G01B 5/008; G01B 5/12
USPC ........................................................... 33/503
See application file for complete search history.

(56) References Cited

U.S. PATENT DOCUMENTS

| | | | | |
|---|---|---|---|---|
| 5,806,201 A * | 9/1998 | Feichtinger | .......... | G01B 11/007 33/556 |
| 7,024,333 B2 * | 4/2006 | Rogele | ................ | G05B 19/401 33/504 |
| 7,490,411 B2 * | 2/2009 | Matsumiya | ............ | G01B 5/204 33/199 R |
| 7,900,367 B2 * | 3/2011 | Sutherland | .......... | G01B 21/042 33/502 |
| 8,908,901 B2 * | 12/2014 | Mamour | .............. | G01B 21/045 382/100 |
| 9,719,779 B2 * | 8/2017 | Ishikawa | .............. | G01B 21/045 |
| 10,145,682 B2 * | 12/2018 | Sagemueller | ........ | G05B 19/401 |
| 10,281,255 B2 * | 5/2019 | Seitz | ...................... | G01B 21/04 |

(Continued)

FOREIGN PATENT DOCUMENTS

| | | |
|---|---|---|
| GB | 2 108 715 B | 5/1985 |
| JP | H04-063664 A1 | 2/1992 |

(Continued)

*Primary Examiner* — George B Bennett
(74) *Attorney, Agent, or Firm* — Burr & Brown, PLLC

(57) ABSTRACT

A position measurement method for an object in a machine tool measures a position of an object with a probe using a machine tool. The machine tool includes three or more translational axes, a rotatable main spindle, and a table. The probe is a position measurement sensor mountable to the main spindle. The position measurement method includes preliminarily obtaining compensation values of contact positions in a radial direction of the probe in at least two directions where main spindle rotation angles are different by 180°, determining the main spindle rotation angle at a contact with a measurement surface of the object corresponding to the measurement content, and calculating a measurement value of the position of the object from a position of the probe at the contact with the measurement surface and the compensation value in accordance with the determined main spindle rotation angle.

4 Claims, 7 Drawing Sheets

(56) References Cited

U.S. PATENT DOCUMENTS

| | | | |
|---|---|---|---|
| 10,357,863 B2 * | 7/2019 | Matsushita | G01B 21/045 |
| 2017/0299366 A1 | 10/2017 | Kanbe et al. | |

FOREIGN PATENT DOCUMENTS

| | | |
|---|---|---|
| JP | H05-047345 B2 | 7/1993 |
| JP | 2017-193043 A1 | 10/2017 |

* cited by examiner

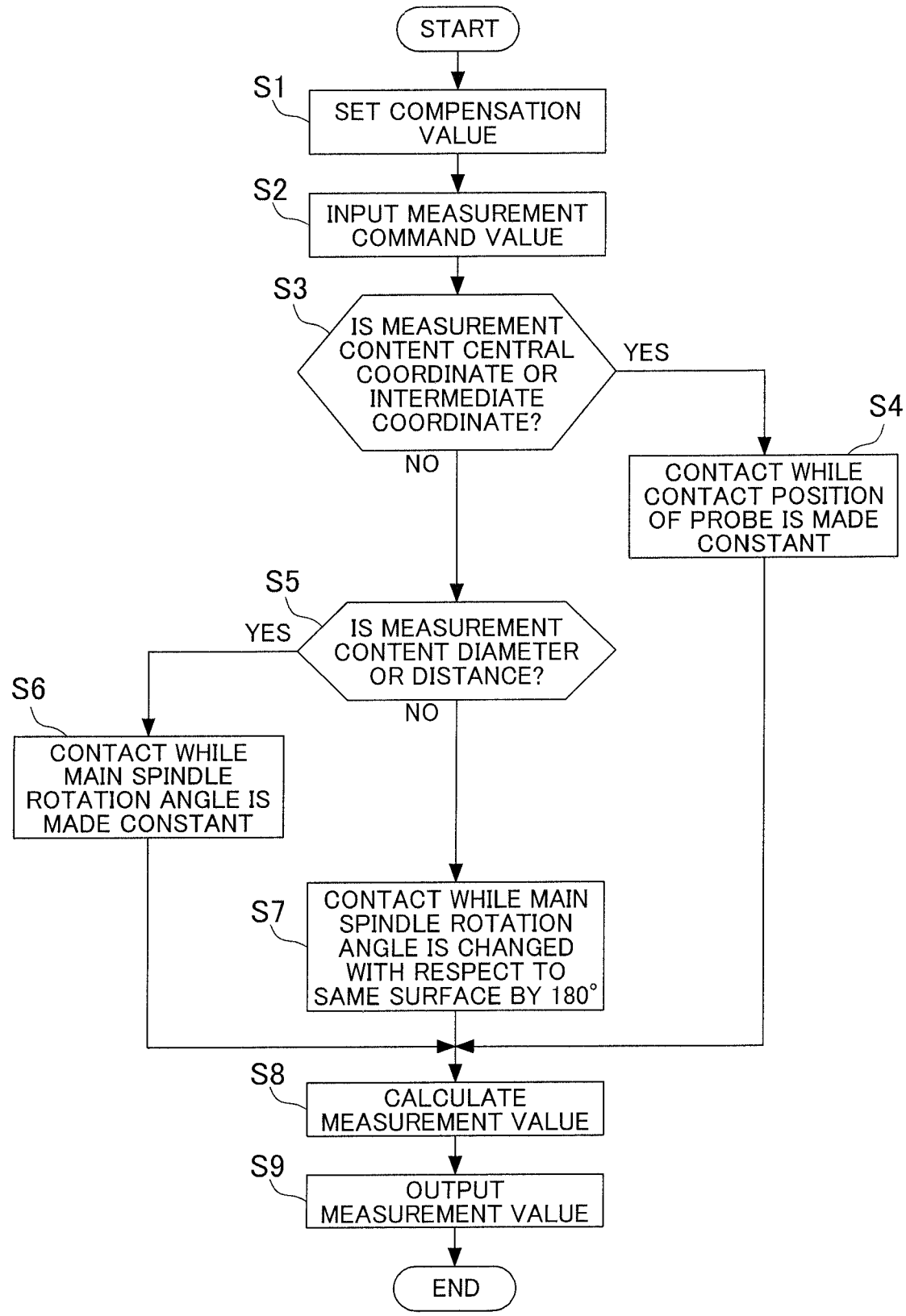

POSITION MEASUREMENT METHOD AND POSITION MEASUREMENT SYSTEM FOR OBJECT IN MACHINE TOOL

BACKGROUND OF THE INVENTION

This application claims the benefit of Japanese Patent Application Number 2019-101666 filed on May 30, 2019, the entirety of which is incorporated by reference.

TECHNICAL FIELD OF THE INVENTION

The disclosure relates to a position measurement method and a position measurement system for measuring a position of an object, such as a tool or a workpiece, in a machine tool.

DESCRIPTION OF RELATED ART

A known automatic measurement of a position and dimensions of a workpiece are performed by a touch trigger probe (probe) for a machining with high accuracy in a machine tool. The machine tool machines the workpiece mounted on a table by a tool that is mounted to a main spindle and rotated. The touch trigger probe (probe) includes a stylus ball contactable with the workpiece, and is mounted to the main spindle. In the measurement of the position and the dimensions by the probe, calibration is performed to obtain a compensation value for compensating a diameter offset of the stylus ball, a stylus length offset, a center misalignment between the main spindle center and the probe, and the like.

For example, in Japanese Examined Patent Application Publication No. 5-47345 (JP-B-5-47345), a probe 25 contacts an inner diameter on one side of a reference bore 24 of a workpiece 14, and on the opposite side, the probe 25 contacts the inner diameter of the reference bore 24 while a main spindle (main spindle 16) is rotated by 180°. Then, first and second relative positions AX1 and AX2 are obtained in a state where the same probe offset is provided to the opposing surfaces, thus averaging them to obtain the center position of the reference bore 24.

In Japanese Unexamined Patent Application Publication No. 2017-193043, calibration of respective compensation values of a probe diameter and a probe length is simultaneously performed by multiple times of contact of a touch trigger probe 30 with a reference sphere 44.

Further, in the method disclosed in Japanese Unexamined Patent Application Publication No. 4-63664, a reference compensation value as a compensation value of a probe diameter in one direction is preliminarily obtained and stored (compensation value storage unit 12). At measuring a workpiece, a compensation value corresponding to a measurement direction is obtained from the reference compensation value while having the same contact position of the probe by changing a main spindle rotation angle such that the measurement direction matches the direction according to the reference compensation value.

In the methods, the position and the posture of the probe with respect to the main spindle change to generate an error in the measurement of the workpiece by the probe in the following case. For example, it is a case where, after performing the calibration of the probe to obtain the compensation values for the probe, thermal distortion of the probe occurs due to room temperature change and the like, or an external force acts due to touch of a hand and the like to change a mounting angle of the probe. While the influence of the measurement error can be reduced by increasing a frequency of the calibration, it requires labor.

The measurement content of the workpiece by the probe can include at least any of, for example, XY-coordinates of any surface of the workpiece (coordinate on a plane expanding in the radial direction of the probe), an inner diameter of any hole, an outer diameter of a cylindrical object, an intermediate coordinate, a distance between any two surfaces, and the central coordinate of any portion, in addition to the above-described measurement contents.

Therefore, it is a main object of the disclosure to provide a measurement method and a measurement system for measuring a position of an object in a machine tool in a state where an error is reduced corresponding to a measurement content even when a status of a probe relative to a main spindle changes after performing calibration.

SUMMARY OF THE INVENTION

In order to achieve the above-described object, a position measurement method according to a first aspect of the disclosure is provided. The position measurement method measures a position of an object with a probe using a machine tool. The machine tool includes three or more translational axes, a rotatable main spindle to which a tool is mounted, and a table. The probe is a position measurement sensor mountable to the main spindle. The object is fixed on the table. A measurement content is at least any of a diameter of a hole, a diameter of a cylindrical object, a distance between two surfaces, a central coordinate of a hole, a central coordinate of a cylindrical object, an intermediate coordinate between two surfaces, and a coordinate of any surface of the object. The position measurement method includes preliminarily obtaining compensation values of contact positions in a radial direction of the probe in at least two directions where main spindle rotation angles as rotation angles of the main spindle are different by 180°, determining the main spindle rotation angle at a contact with a measurement surface of the object corresponding to the measurement content, and calculating a measurement value of the position of the object from a position of the probe at the contact with the measurement surface and the compensation value in accordance with the main spindle rotation angle determined in the determining of the main spindle rotation angle.

In order to achieve the above-described object, a position measurement system according to a second aspect of the disclosure is provided. The position measurement system measures a position of an object with a probe in a machine tool. The machine tool includes three or more translational axes, a rotatable main spindle to which a tool is mounted, a table, the probe, and a control device. The probe is a position measurement sensor mountable to the main spindle. The control device controls the translational axes and the main spindle. The object is fixed on the table. A measurement content is at least any of a diameter of a hole, a diameter of a cylindrical object, a distance between two surfaces, a central coordinate of a hole, a central coordinate of a cylindrical object, an intermediate coordinate between two surfaces, and a coordinate of any surface of the object. The position measurement system includes a compensation value setting unit, a main spindle rotation angle control unit, and a calculation unit. The compensation value setting unit sets compensation values of contact positions in a radial direction of the probe in at least two directions where main spindle rotation angles as rotation angles of the main spindle are different by 180°. The main spindle rotation angle control unit controls the main spindle rotation angle at a contact with a measurement surface of the object corresponding to the measurement content. The calculation unit calculates a measurement value of the position of the object from a position of the probe at the contact with the measurement surface and the compensation value.

The disclosure provides a main effect of providing the measurement method and the measurement system for measuring the position of the object in the machine tool in the state where an error is reduced corresponding to the measurement content even when a status of the probe relative to the main spindle changes after performing calibration.

BRIEF DESCRIPTION OF THE DRAWINGS

FIG. 7 is a flowchart of an exemplary operation of the position measurement (exemplary position measurement method) according to the disclosure.

DETAILED DESCRIPTION OF THE INVENTION

The following describes an embodiment and modification examples according to the disclosure appropriately based on the drawings.

The disclosure is not limited to the embodiment and the modification examples below. Respective directions of front and back, up and down, and right and left are defined for convenience of explanation, and change in some cases because of at least any of an aspect of holding a probe 7, a relative positional relationship between the probe 7 and an object W of the position measurement, and the operation such as the rotation.

Figure 1:
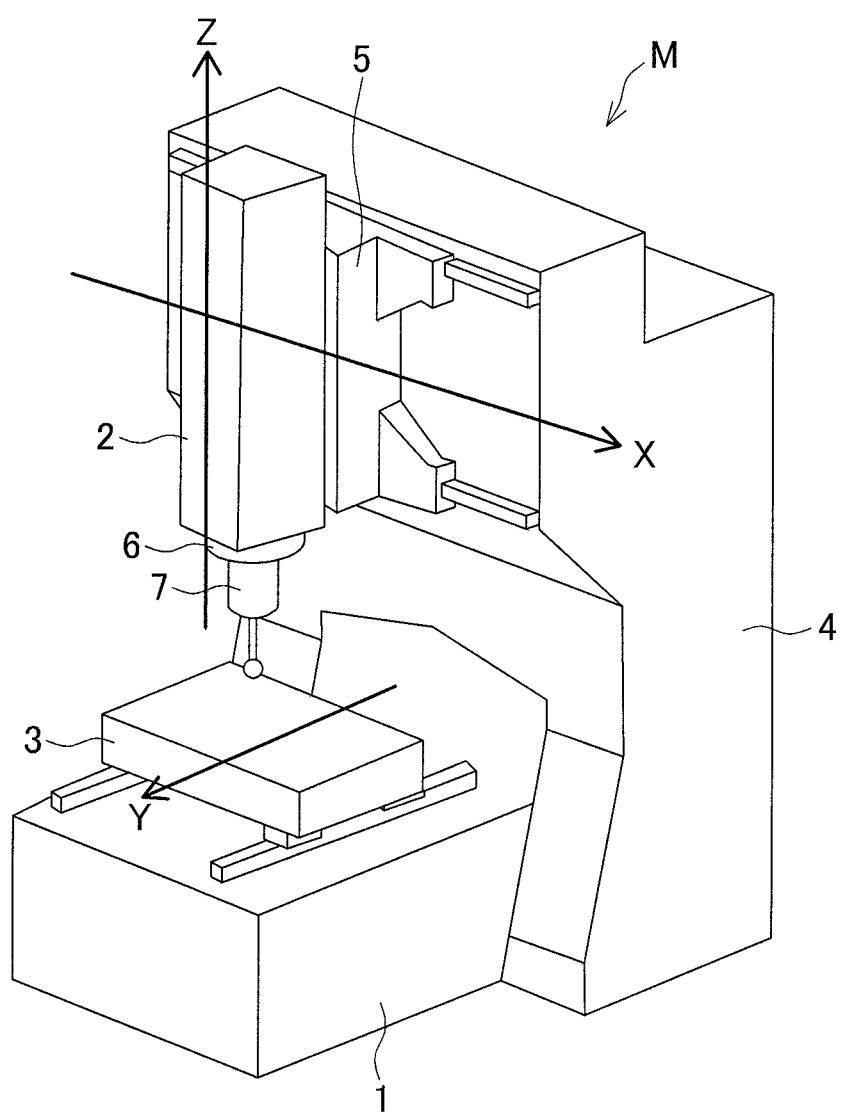
FIG. 1 is a schematic perspective view of a machining center according to the disclosure.

FIG. 1 is a schematic perspective view of a machining center M as one embodiment of a machine tool according to the disclosure.

The machining center M has three mutually orthogonal translational axes, an X-axis (axis in a right-left direction), a Y-axis (axis in a front-back direction), and a Z-axis (axis in an up-down direction).

The machining center M includes a spindle head 2 movable with respect to a bed 1 with two degrees of freedom for translation on the X-axis and the Z-axis. The spindle head 2 is mounted to a saddle 5 movably in the Z-axis direction. The saddle 5 is installed to a column 4, which is disposed upright from the bed 1, movably in the X-axis direction.

The machining center M includes a table 3 on which a workpiece as an object of machining and an object W of the position measurement are fixable. The table 3 is movable with respect to the bed 1 with one degree of freedom for translation on the Y-axis perpendicular to the X-axis and the Z-axis.

Accordingly, the spindle head 2 is movable with respect to the table 3 with three degrees of freedom for translation.

The spindle head 2 supports a column-shaped main spindle 6 rotatable around a center axis in the Z-axis direction.

At machining of the workpiece on the table 3 by the machining center M, the main spindle 6, to which a tool (not illustrated) is mounted, is rotated under a control by a numerical control device (control device) (not illustrated). Then, appropriate movements of the spindle head 2 and the table 3 along the respective translational axes are executed under the control by the numerical control device via a servomotor (not illustrated). Thus, the numerical control device controls a relative position and a relative posture between the workpiece and the tool, thereby performing an intended machining to the workpiece by the tool.

At the position measurement of the object W on the table 3 for improving accuracy and the like, the probe 7 as a touch trigger probe is mounted and fixed to the main spindle 6. The probe 7 is mounted so as to extend in the Z-axis direction, includes a stylus ball on the lower end, and functions as a position measurement sensor configured to detect the position.

The machine tool according to the disclosure may be a lathe, a multitasking machine, a grinder. For the translational axes, two or less axes or four or more axes may be provided. Further, the machine tool may have one or more degree of freedom for rotation by, for example, providing rotation shafts to the spindle head 2 and the table 3.

Figure 2:
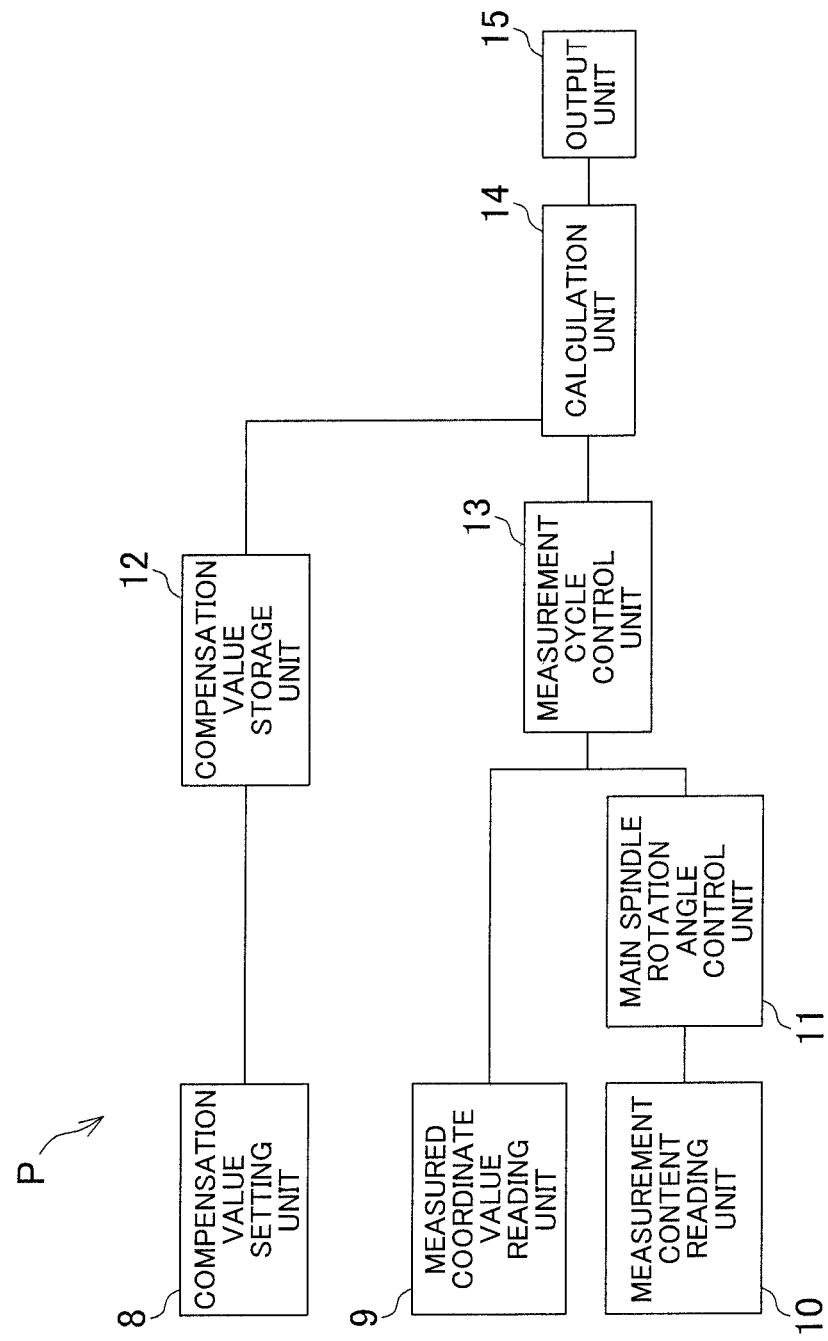
FIG. 2 is a block diagram of a position measurement system of an object according to the machining center of FIG. 1.

FIG. 2 is a block diagram of a position measurement system P for the object W according to the machining center M.

The position measurement system P includes a compensation value setting unit 8, a compensation value storage unit 12, a measured coordinate value reading unit 9, a measurement content reading unit 10, a main spindle rotation angle control unit 11, a measurement cycle control unit 13, a calculation unit 14, and an output unit 15. The compensation value setting unit 8 sets compensation values ΔXm, ΔXp to compensate an offset between the contact position of the probe 7 and the center of the main spindle 6. The compensation value storage unit 12 stores the compensation values ΔXm, ΔXp. The measured coordinate value reading unit 9 reads a measurement start coordinate at a time of a measurement command. The measurement content reading unit 10 reads the measurement content of the object W (here, workpiece) from the measurement command. The main spindle rotation angle control unit 11 controls the rotation angle of the main spindle 6 by a preliminarily set operation based on the read measurement content. The measurement cycle control unit 13 controls a feed axis (translational axis) at the measurement by a preliminarily set operation from the read measurement start coordinate and measurement content. The calculation unit 14 calculates a value of the measurement content based on the central coordinate of the main spindle 6 on the measurement surface obtained by the measurement cycle control unit 13 and the compensation value of the offset between the contact position of the probe 7 and the center of the main spindle 6 in the compensation value storage unit 12. The output unit 15 outputs the value of the measurement content obtained by the calculation unit 14.

The measurement content of the object W includes (1) a central coordinate of a hole, a central coordinate of a cylindrical object, and an intermediate coordinate between two surfaces, (2) an inner diameter of a hole, an outer diameter of a cylindrical object, and a distance between two surfaces, and (3) the XY-coordinate of any surface.

The output unit 15 displays the value of the measurement content on, for example, a screen of a monitor (not illustrated), or outputs as a data file.

Next, a description will be given of the calculation and the like of the position measurement of the object W by the position measurement system P.

Figure 3A:
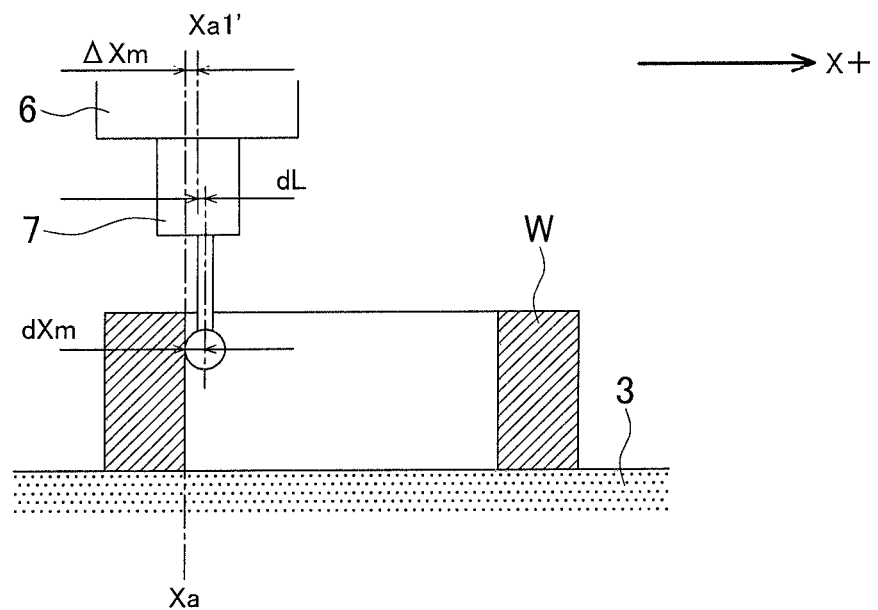
FIG. 3A is a schematic diagram illustrating a main spindle central coordinate Xa1' when a measurement surface on an inner surface of a hole is set at a coordinate Xa on an X-axis and a stylus ball of a probe contacts the measurement surface in a state where a main spindle rotation angle is at a reference position.
Figure 3B:
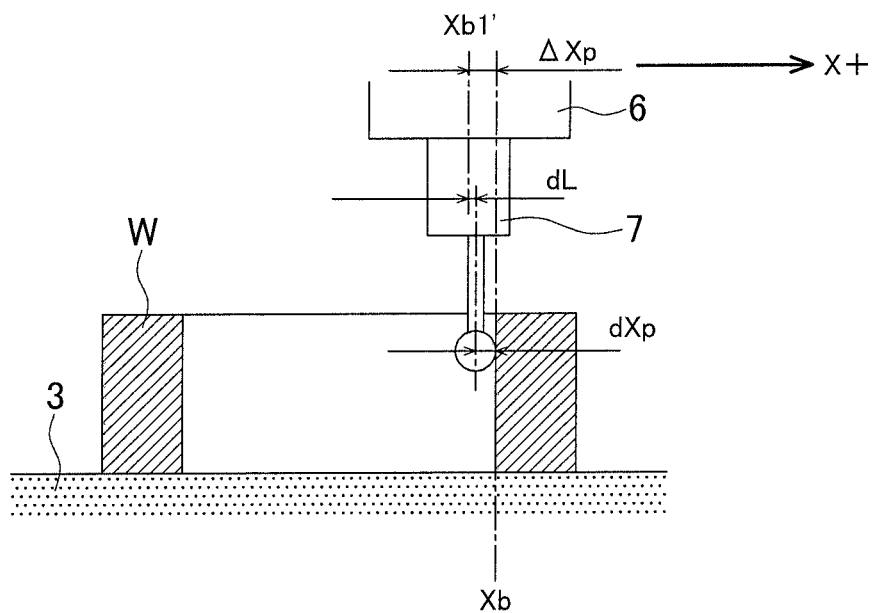
FIG. 3B is a schematic diagram illustrating a main spindle central coordinate Xb1' when a measurement surface on the inner surface of the hole is set at a coordinate Xb on the X-axis and the stylus ball of the probe contacts the measurement surface in the state where the main spindle rotation angle is at the reference position.

FIGS. 3A and 3B are schematic diagrams illustrating a relationship between central coordinates Xa1' and Xb1' of the main spindle 6 when two measurement surfaces on the inner surface of the hole of the object W are set at the coordinates Xa and Xb on the X-axis and the stylus ball of the probe 7 contacts the measurement surfaces.

Figure 4A:
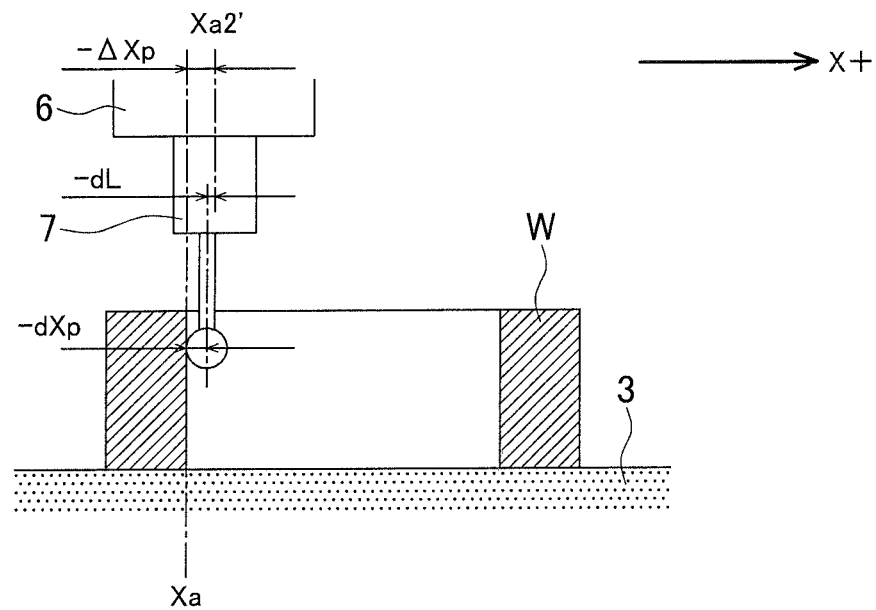
FIG. 4A is a schematic diagram illustrating a main spindle central coordinate Xa2' when the measurement surface on the inner surface of the hole is set at the coordinate Xa on the X-axis and the stylus ball of the probe contacts the measurement surface in a state where the main spindle rotation angle is rotated from the reference position by 180°.
Figure 4B:
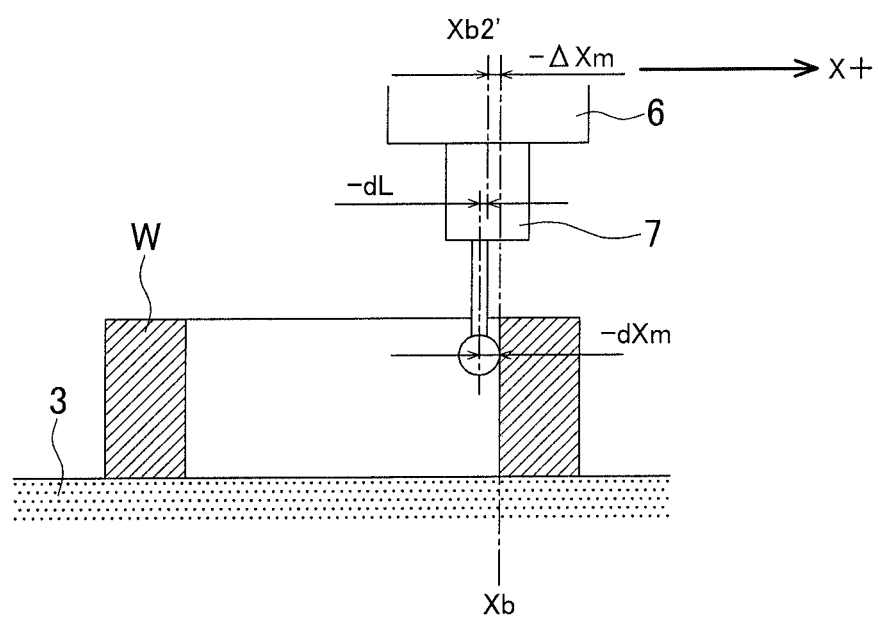
FIG. 4B is a schematic diagram illustrating a main spindle central coordinate Xb2' when the measurement surface on the inner surface of the hole is set at the coordinate Xb on the X-axis and the stylus ball of the probe contacts the measurement surface in the state where the main spindle rotation angle is rotated from the reference position by 180°.

FIGS. 4A and 4B are schematic diagrams illustrating a relationship between central coordinates Xa2' and Xb2' of the main spindle 6 when two measurement surfaces on the inner surface of the hole of the object W are set at the coordinates Xa and Xb on the X-axis and the stylus ball of the probe 7 contacts the measurement surfaces in a state where the rotation angles of the main spindle 6 are different by 180° from the rotation angles of the main spindle 6 in FIGS. 3A and 3B.

FIGS. 3A and 3B illustrate a case where the rotation angle of the main spindle 6 is at a reference position, and FIGS. 4A and 4B illustrate a case where the rotation angle of the main spindle 6 is rotated from the reference position by 180°.

In the case where the rotation angle of the main spindle 6 is at the reference position, a diameter offset in a positive X-direction of the stylus ball is dXp, a diameter offset in a negative X-direction of the stylus ball is dXm, and a center misalignment amount between the center of the main spindle 6 and the probe 7 is dL.

In FIG. 3A, the relationship between the coordinate Xa of the measurement surface and the central coordinate Xa1' of the main spindle 6 is expressed by the following formula 1.

$$Xa = Xa1' + (dL + dXm) \quad \text{Formula 1}$$

In the actual calibration, it is difficult to separately measure the center misalignment amount dL between the center of the main spindle 6 and the probe 7 and the diameter offset dXm of the stylus ball, and (dL+dXm) in the formula 1 is obtained as an offset ΔXm between the contact position of the probe 7 and the center of the main spindle 6 (formula 2 below).

$$\Delta Xm = (dL + dXm) \quad \text{Formula 2}$$

The formula 1 is expressed by the following formula 1' using the formula 2.

$$Xa = Xa1' + \Delta Xm \quad \text{Formula 1'}$$

Similarly, in FIG. 3B, the relationship between the coordinate Xb of the measurement surface and the central coordinate Xb1' of the main spindle 6 is expressed by the following formula 3.

$$Xb = Xb1' + (dL + dXp) \quad \text{Formula 3}$$

An offset ΔXp between the contact position of the probe 7 and the center of the main spindle 6 is expressed by the following formula 4.

$$\Delta Xp = (dL + dXp) \quad \text{Formula 4}$$

The formula 3 is expressed by the following formula 3' using the formula 4.

$$Xb = Xb1' + \Delta Xp \quad \text{Formula 3'}$$

In FIG. 4A illustrating the case where the rotation angle of the main spindle 6 is rotated from the reference position by 180°, the relationship between the coordinate Xa of the measurement surface and the central coordinate Xa2' of the main spindle 6 is expressed by the following formula 5.

$$Xa = Xa2' + (-dL - dXp) \quad \text{Formula 5}$$

The formula 5 is expressed by the following formula 5' using the formula 4.

$$Xa = Xa2' - \Delta Xp \quad \text{Formula 5'}$$

Similarly, in FIG. 4B, the relationship between the coordinate Xb of the measurement surface and the central coordinate Xb2' of the main spindle 6 is expressed by the following formula 6.

$$Xb = Xb2' + (-dL - dXm) \quad \text{Formula 6}$$

The formula 6 is expressed by the following formula 6' using the formula 2.

$$Xb = Xb2' - \Delta Xm \quad \text{Formula 6'}$$

Then, an inner diameter D of the hole as a difference between Xa and Xb is expressed by the following formula 7 and formula 7' using Xa1' and Xb1'.

$$D = Xb - Xa$$
$$= (Xb1' + \Delta Xp) - (Xa1' + \Delta Xm)$$
$$= (Xb1' - Xa1') + (\Delta Xp - \Delta Xm)$$
$$= (Xb1' - Xa1') + \{(dL + dXp) - (dL + dXm)\}$$
$$= (Xb1' - Xa1') + (dXp - dXm) \quad \text{Formula 7'}$$

The inner diameter D is calculated using the offsets ΔXp and ΔXm between the contact position of the probe 7 and the center of the main spindle 6 without the influence of the center misalignment amount dL between the center of the main spindle 6 and the probe 7.

Similarly to the calculation of the inner diameter D, the outer diameter of the cylindrical object and the distance between the two surfaces can be calculated (see measurement content (2) described above).

A central coordinate CX of the hole as an intermediate value between Xa and Xb is expressed by the following formula 8 and formula 8' using Xa1' and Xb2'.

$$CX = (Xb + Xa)/2 \quad \text{Formula 8}$$
$$= \{(Xb2' - \Delta Xm) + (Xa1' + \Delta Xm)\}/2$$
$$= (Xb2' + Xa1')/2 \quad \text{Formula 8'}$$

The central coordinate CX is calculated using the offsets ΔXp and ΔXm between the contact position of the probe 7 and the center of the main spindle 6 without the influence of the center misalignment amount dL between the center of the main spindle 6 and the probe 7.

Similarly to the calculation of the central coordinate CX, the central coordinate of the cylindrical object and the intermediate coordinate between the two surfaces can be calculated (see measurement content (1) described above).

Further, the Xa coordinate is expressed by the following formula 9 and formula 9' using Xa1' and Xa2'.

$$Xa = \{(Xa1' + \Delta Xm) + (Xa2' - \Delta Xp)\}/2 \quad \text{Formula 9}$$
$$= [(Xa1' + Xa2') + \{(dL + dXm) - (dL + dXp)\}]/2$$
$$= \{(Xa1' + Xa2') + (dXm - dXp)\}/2 \quad \text{Formula 9'}$$

The Xa coordinate is calculated using the offsets ΔXp and ΔXm between the contact position of the probe 7 and the center of the main spindle 6 without the influence of the center misalignment amount dL between the center of the main spindle 6 and the probe 7.

Similarly to the calculation of the Xa coordinate, the Xb coordinate can be calculated (see measurement content (3) described above).

Subsequently, a description will be given of an exemplary operation (exemplary position measurement method) of the position measurement of the object W (workpiece) appropriately using the calculation and the like.

Figure 5A:
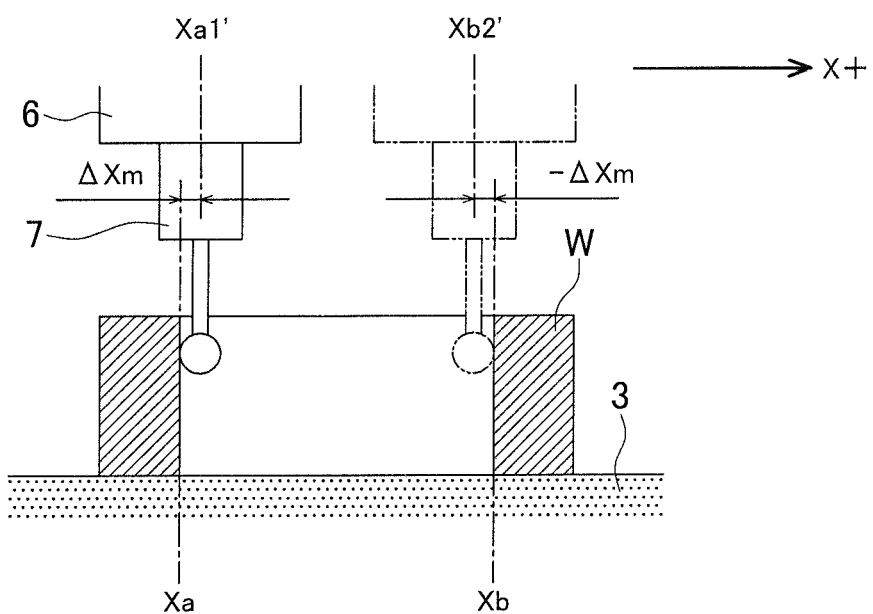
FIG. 5A is a schematic diagram illustrating measurement of a central coordinate of the hole and a diameter in the X-axis direction of the object according to the disclosure, and illustrates a case where the probe contacts measurement surfaces such that a contact position of the probe with the measurement surfaces becomes the same by changing the main spindle rotation angle.
Figure 5B:
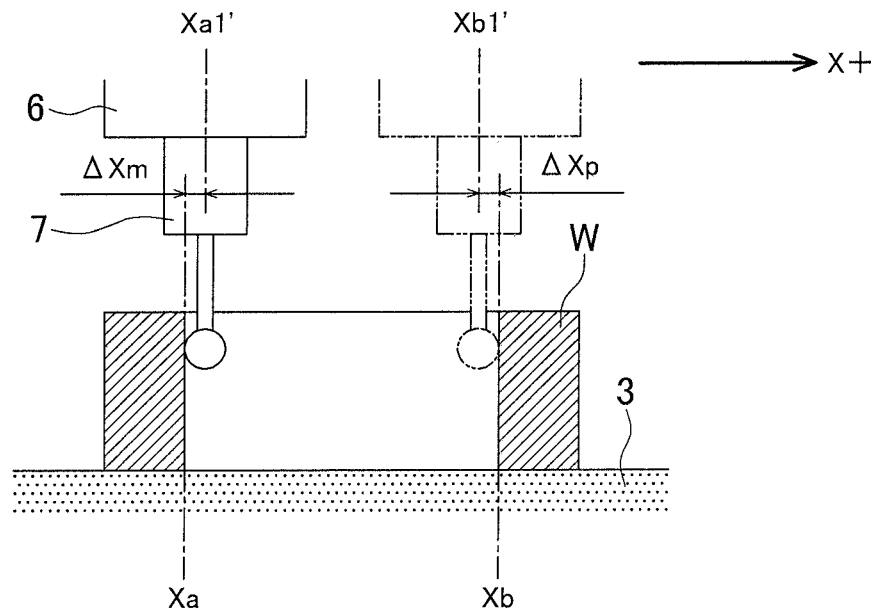
FIG. 5B is a schematic diagram illustrating the measurement of the central coordinate of the hole and the diameter in the X-axis direction of the object according to the disclosure, and illustrates a case where the probe contacts the measurement surfaces in a state where the main spindle rotation angle is at a predetermined position.

FIGS. 5A and 5B are schematic diagrams illustrating measurements of the central coordinate of the hole of the object W and a diameter in the X-axis direction. FIG. 5A illustrates a case where the probe 7 contacts the measurement surfaces such that the contact position of the probe 7 with the measurement surfaces becomes the same by changing the rotation angle of the main spindle 6. FIG. 5B illustrates a case where the probe 7 contacts the measurement surfaces in a state where the rotation angle of the main spindle 6 is at a predetermined position.

In FIGS. 5A and 5B, Xa is the X coordinate of the contact surface on the negative X-side, and Xb is the X coordinate of the contact surface on the positive X-side. Xa1' and Xb1' are the central coordinates of the main spindle 6 when the rotation angle of the main spindle 6 is at the reference position, and Xb2' is the central coordinate of the main spindle 6 when the rotation angle of the main spindle 6 is at a position rotated from the reference position by 180°.

Figure 6A:
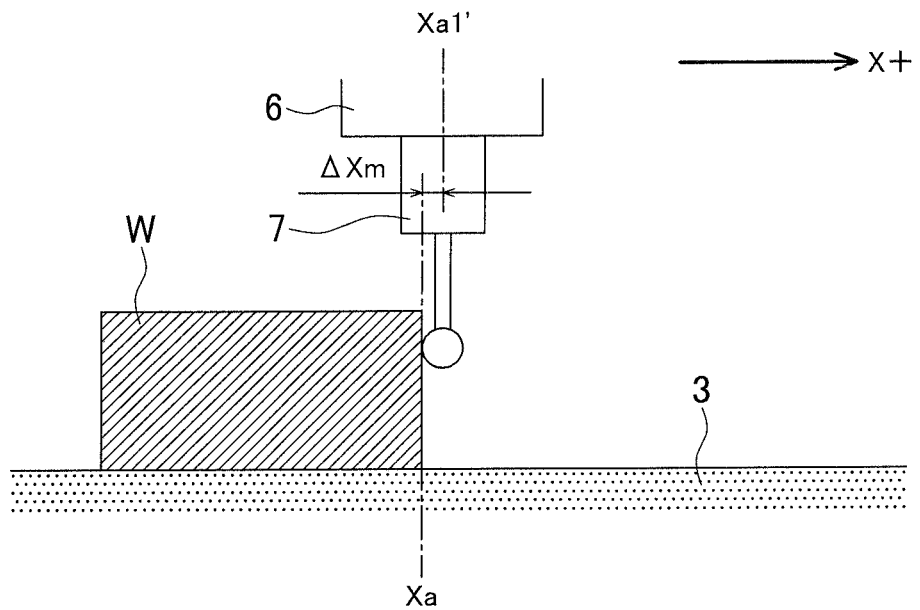
FIG. 6A is a schematic diagram illustrating measurement in the X-axis direction of a coordinate of any surface of the object according to the disclosure, and illustrates a case where the probe contacts a measurement surface in a state where the main spindle rotation angle is at a predetermined position.
Figure 6B:
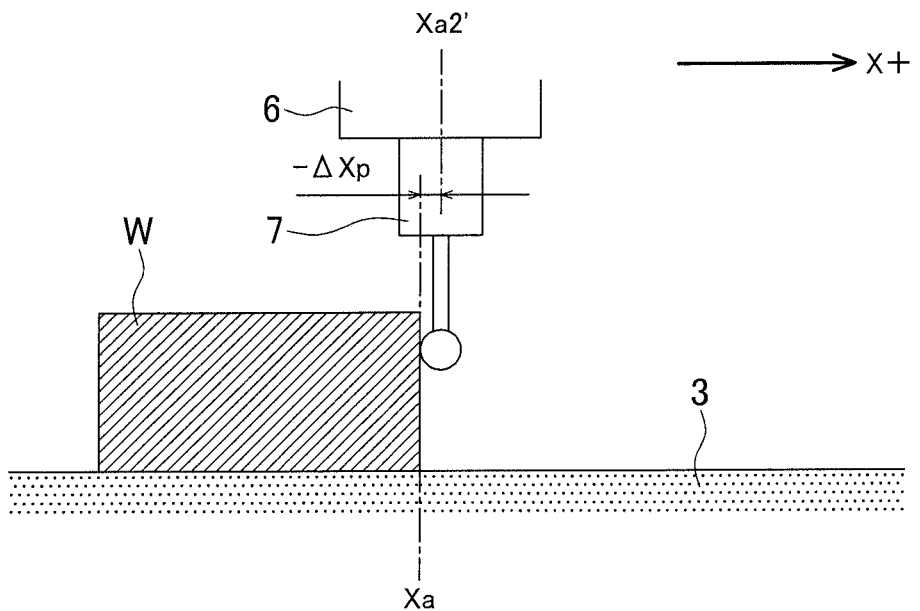
FIG. 6B is a schematic diagram illustrating the measurement in the X-axis direction of the coordinate of any surface of the object according to the disclosure, and illustrates a case where the main spindle rotation angle is rotated with respect to the reference position by 180°.

FIGS. 6A and 6B are schematic diagrams illustrating measurements in the X-axis direction of coordinates of any surface of the object W, FIG. 6A illustrates a case where the probe 7 contacts the measurement surface in a state where the rotation angle of the main spindle 6 is at a predetermined position, and FIG. 6B illustrates a case where the rotation angle of the main spindle 6 is at a position rotated from the reference position by 180°.

In FIGS. 6A and 6B, Xa is the X coordinate of the contact surface on the negative X-side. Xa1' is the central coordinate of the main spindle 6 when the rotation angle of the main spindle 6 is at the reference position, and Xa2' is the central coordinate of the main spindle 6 when the rotation angle of the main spindle 6 is rotated from the reference position by 180°.

FIG. 7 is a flowchart of an exemplary operation of the position measurement (exemplary position measurement method).

In Step S1, an offset amount between the contact position of the probe 7 and the center of the main spindle 6 is measured by a known method (for example, see JP-B-5-47345).

Then, based on the measurement result, the compensation value setting unit 8 sets the offset amounts ΔXm and ΔXp of the contact positions in the radial direction (here, X-axis direction) of the probe 7 in the two directions where the rotation angles of the main spindle 6 are mutually different by 180°, and the offset amounts ΔXm and ΔXp are stored in the compensation value storage unit 12 (the preliminarily obtaining of the compensation values). Three or more kinds of compensation value may be obtained and stored depending on the offset amounts of the contact position in the radial direction of the probe 7 in mutually different three or more directions.

Subsequently, in Step S2, a measurement command value is input, and when a measurement command is accepted, the measured coordinate value reading unit 9 reads a measurement start coordinate. Then, the measurement content reading unit 10 determines whether the measurement content is the central coordinate or the intermediate coordinate according to the above-described (1) (Yes at Step S3), the diameter or the distance according to (2) (No at Step S3, Yes at Step S5), or the coordinate of any surface according to (3) (No at Step S3, No at Step S5) (the determining of the main spindle rotation angle).

When the measurement content is (1) the central coordinate or the intermediate coordinate (Step S4), as illustrated in FIG. 5A, the main spindle rotation angle control unit 11 and the measurement cycle control unit 13 change the rotation angle of the main spindle 6, and obtain contact coordinates Xa1' and Xb2' by bringing the probe 7 into contact with two surfaces (first measurement surface and second measurement surface at its symmetrical position) of the object W in a state where the contact position of the probe 7 is made constant. In other words, the main spindle rotation angle control unit 11 and the measurement cycle control unit 13 change the rotation angle of the main spindle 6 such that the probe 7 contacts both the first measurement surface and the second measurement surface at its symmetrical position at the same contact position.

When the measurement content is (2) the diameter or the distance (Step S6), as illustrated in FIG. 5B, the main spindle rotation angle control unit 11 and the measurement cycle control unit 13 keep the rotation angle of the main spindle 6 constant without change, and obtain the contact coordinates Xa1' and Xb1' by bringing the probe 7 into contact with the two surfaces (first measurement surface and second measurement surface at its symmetrical position) of the object W.

When the measurement content is (3) the coordinate of any surface (Step S7), as illustrated in FIGS. 6A and 6B, the main spindle rotation angle control unit 11 and the measurement cycle control unit 13 change the rotation angle of the main spindle 6 by 180°, and obtain the contact coordinates Xa1' and Xa2' by bringing the probe 7 into contact with the same surface of the object W twice.

After performing any of Steps S4, S6, and S7, the calculation unit 14 calculates the measurement value (Step S8; the calculating).

More specifically, when the measurement content is (1) the central coordinate or the intermediate coordinate, the calculation unit 14 calculates the measurement value by the above-described formula 8.

When the measurement content is (2) the diameter or the distance, the calculation unit 14 calculates the measurement value by the above-described formula 7.

When the measurement content is (3) the coordinate of any surface, the calculation unit 14 calculates the measurement value by the above-described formula 9.

The calculated measurement value is output from the output unit 15 (Step S9).

In the position measurement of the object, the position is calculated corresponding to the measurement content so as not to be influenced by the center misalignment amount dL between the center of the main spindle 6 and the probe 7. Accordingly, the position of the object in the machining center M is measured in the state where the error is reduced even if the status of the probe 7 relative to the main spindle 6 changes after performing the calibration.

The embodiment appropriately includes a further modification example as described below in addition to the above-described modification example.

While the above-described embodiment describes the example with the X-axis, the measurement can be similarly performed with the other one axis, and the measurement can be similarly performed even in the case of two axes including the X-axis and the Y-axis. As the compensation value of the offset between the contact position of the probe 7 and the center of the main spindle 6 used in the case of two axes, the compensation values in two directions (positive and negative directions) obtained in the direction of predetermined one axis may be used for the other axis, or the compensation values may be obtained for the respective axes, in four directions in total, and used corresponding to the axis.

For the measurement content, any of (1) the central coordinate or the intermediate coordinate, (2) the diameter or the distance, and (3) the coordinate of any surface is not necessarily selected, but they may be sequentially measured. In this case, it is only necessary that the contact coordinates are measured at three positions of Xa1', Xb1', and Xb2'.

The disclosure is not limited to the measurement of the inner diameter as illustrated in FIG. 3A to FIG. 5B, and variously changeable relating to, for example, at least any of the measurement of any surface as illustrated in FIGS. 6A and 6B, the measurement of the distance between two surfaces, and the measurement of the center between two surfaces.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. A position measurement method for an object in a machine tool, the position measurement method measuring a position of an object with a probe using a machine tool, the machine tool including three or more translational axes, a rotatable main spindle to which a tool is mounted, and a table, the probe being a position measurement sensor mountable to the main spindle, and the object being fixed on the table, wherein
a measurement content is at least any of a diameter of a hole, a diameter of a cylindrical object, a distance between two surfaces, a central coordinate of a hole, a central coordinate of a cylindrical object, an intermediate coordinate between two surfaces, and a coordinate of any surface of the object,
the position measurement method comprising:
preliminarily obtaining compensation values of contact positions in a radial direction of the probe in at least two directions where main spindle rotation angles as rotation angles of the main spindle are different by 180°;
determining the main spindle rotation angle at a contact with a measurement surface of the object corresponding to the measurement content; and
calculating a measurement value of the position of the object from a position of the probe at the contact with the measurement surface and the compensation value in accordance with the main spindle rotation angle determined in the determining of the main spindle rotation angle.

2. The position measurement method for the object in the machine tool according to claim 1, wherein
in the determining of the main spindle rotation angle;
when the measurement content is at least any of the central coordinate of the hole, the central coordinate of the cylindrical object, and the intermediate coordinate between the two surfaces, the determining is performed such that the probe contacts a first measurement surface and a second measurement surface at a symmetrical position to the first measurement surface of the object at identical contact positions by changing the main spindle rotation angle;
when the measurement content is at least any of the diameter of the hole, the diameter of the cylindrical object, and the distance between the two surfaces, the determining is performed such that the probe contacts the first measurement surface and the second measurement surface at the symmetrical position to the first measurement surface of the object in a state where the main spindle rotation angle is constant; and
when the measurement content is the coordinate of any surface, the determining is performed such that after the contact with the measurement surfaces of the object, the probe contacts the identical measurement surface by changing the main spindle rotation angle.

3. A position measurement system for an object in a machine tool, the position measurement system measuring a position of an object with a probe in a machine tool, the machine tool including three or more translational axes, a rotatable main spindle to which a tool is mounted, a table, the probe, and a control device, the probe being a position measurement sensor mountable to the main spindle, the control device controlling the translational axes and the main spindle, and the object being fixed on the table, wherein a measurement content is at least any of a diameter of a hole, a diameter of a cylindrical object, a distance between two surfaces, a central coordinate of a hole, a central coordinate of a cylindrical object, an intermediate coordinate between two surfaces, and a coordinate of any surface of the object, the position measurement system comprising:

a compensation value setting unit that sets compensation values of contact positions in a radial direction of the probe in at least two directions where main spindle rotation angles as rotation angles of the main spindle are different by 180°;

a main spindle rotation angle control unit that controls the main spindle rotation angle at a contact with a measurement surface of the object corresponding to the measurement content; and a calculation unit that calculates a measurement value of the position of the object from a position of the probe at the contact with the measurement surface and the compensation value.

4. The position measurement system for the object in the machine tool according to claim 3 wherein in the main spindle rotation angle control unit:

when the measurement content is at least any of the central coordinate of the hole, the central coordinate of the cylindrical object, and the intermediate coordinate between the two surfaces, the main spindle rotation angle is changed such that the probe contacts a first measurement surface and a second measurement surface at a symmetrical position to the first measurement surface of the object at identical contact positions;

when the measurement content is at least any of the diameter of the hole, the diameter of the cylindrical object, and the distance between the two surfaces, the main spindle rotation angle is kept constant with respect to the first measurement surface and the second measurement surface at the symmetrical position to the first measurement surface of the object; and when the measurement content is the coordinate of any surface, after the contact with the measurement surfaces of the object, the main spindle rotation angle is changed when the probe contacts the identical measurement surface.

* * * * *